United States Patent Office 3,321,607
Patented May 23, 1967

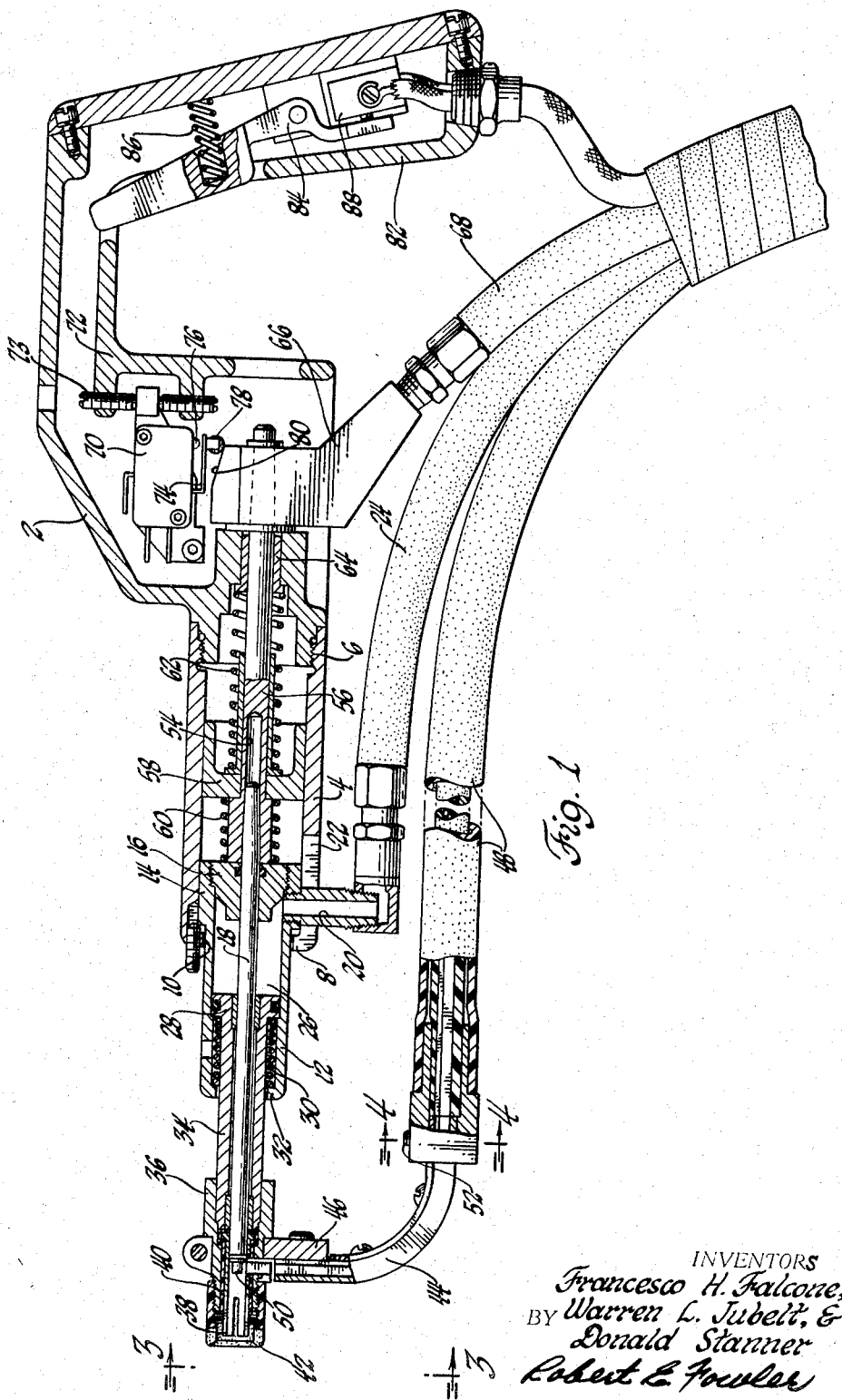

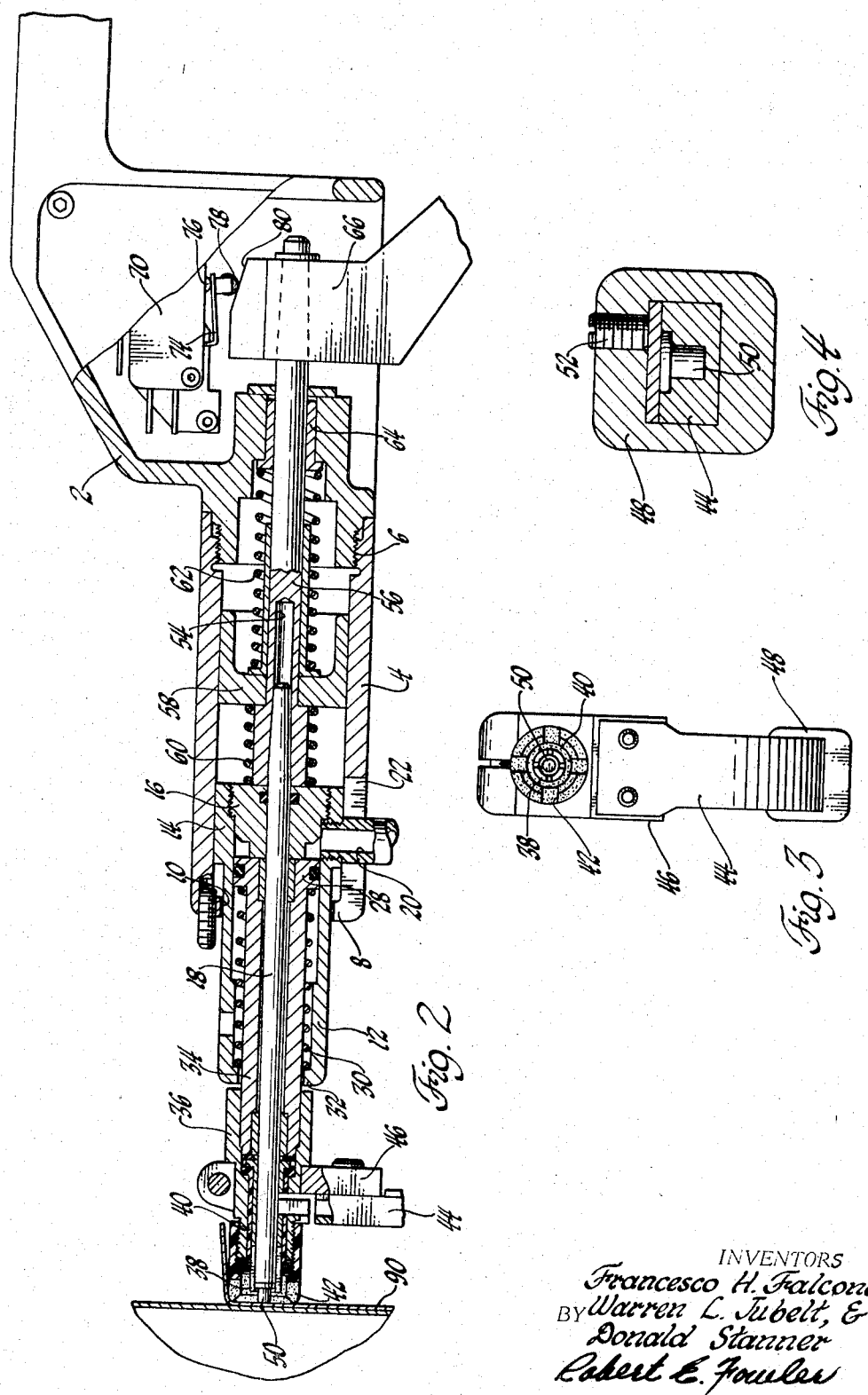

3,321,607
AUTOMATIC FEED RESISTANCE WELDING GUN
Francesco Henry Falcone, Warren, Warren Le Roy Jubelt, East Detroit, and Donald Stanner, Dearborn, Mich., assignors to General Motors Corporation, Detroit, Mich., a corporation of Delaware
Filed Oct. 1, 1965, Ser. No. 491,920
3 Claims. (Cl. 219—98)

ABSTRACT OF THE DISCLOSURE

The present disclosure relates to a portable resistance welding gun which is combined with automatic means for feeding parts to be welded by the gun. The parts are brought into position in front of the gun so that with an application of the same to a workpiece all that is required of the operator will be to apply pressure and the part will be forced against the workpiece, resistance welded to attach the same and remove the gun, and automatically feed a new part into place for the next welding operation.

State of the prior art

The problem of securing small parts to large flat surfaces has been solved in the past by the use of electric welding in which an arc has been drawn between the part to be secured to the surface and the surface, and, when the two spaced adjacent areas were sufficiently softened and molten, the part was forced into the surface and held until the assembly solidified. When this method was used to attach small rivets or studs to the side of an automobile body panel to support molding or trim it was slow when the gun was hand loaded and hard to handle, and the arc burned the surface and pitted the same with splatter making it difficult to obtain a smooth painted surface. Also, arc welding is to some extent critical, requiring accurate synchronization of the electrical and mechanical functions of the welding equipment.

It is the purpose of this invention to utilize resistance welding instead of arc welding and also to supply the parts sequentially automatically from a storage reservoir to the nose of the welding gun so that all the operator has to do is to continue to remove and apply the nose of the gun to a work sheet where it is desired to secure the parts.

Description of the invention

The novel combination resistance welding gun and automatic feed therefor are illustrated in the accompanying drawings in which:

FIGURE 1 is a side elevational view partly in section of a gun in loading position embodying our invention;

FIG. 2 is a view similar to FIG. 1 of a portion of the gun showing the parts in triggered welding position;

FIG. 3 is a front view of the gun taken along the line 3—3 of FIG. 1; and,

FIG. 4 is an enlarged sectional view taken on line 4—4 of FIG. 1.

The welding gun consists of a main frame 2, to which is secured a forward portion consisting of a hollow cylinder 4 which is threadedly attached at 6 to the main body. The forward end of the cylinder barrel is flanged inwardly at 8 to provide a smaller circular opening 10 through which projects a slidable nose section 12. The inner end 14 of the nose section 12 is of the same external diameter as the internal diameter of the cylinder 4 and slides axially therein. A plug 16 is screw threaded into the inner end of the inner end 14 of the nose 12 and has a central bore therein which acts as a bearing for a central rod 18 extending therethrough. An inlet port 20 is threaded through the lower wall of the nose 12 and it projects through a slot 22 in the lower surface of the cylinder 4 to supply air pressure from air hose 24 to the central chamber 26 in the nose section 12. A slidable piston assembly 28 mounted inside the nose section 12 and sealing against the inner surface is mounted on the rod 18 for reciprocal movement. It is spring biased toward the rear of the gun by a coil spring 30 surrounding the piston body and having one end bearing against the piston head and the other against the flanged end 32 of the nose section 12. Thus, the spring 30 tends to urge the piston 28 toward the rear of this section and the air pressure from the hose 24 when applied tends to move the piston 28 along the rod to the front.

Mounted on the front of the piston shank 34 is a collet holder 36 which carries the collet 38 which is separated therefrom by an insulated liner 40. The forward portion of the collet holder 36 is threaded and an insulating collet guard 42 is screwed thereon to protect the projecting end of the collet 38. Carried by the collet holder 36 is one end of the feed channel 44 for automatically feeding work parts, such as studs, to a position for application to the work. This channel is flexible and has a T-shaped slot therein, said one end being supported directly on the member 36 by any suitable means, such as a clamp collar 46 and the opposite end connected directly through a supply hose 48 to the reservoir for the parts. The cross-section of the slot is best shown in FIG. 4 where the slot per se shows a stud 50 in place and being fed therethrough, the end of the channel 44 being clamped in the supply hose 48 by a set screw 52.

The inner end of the rod 18 is taper fitted into the end of an axial opening 54 in longitudinal shaft 56. This shaft is in turn supported at one end by an annular member 58 which slidably fits in the bore in the cylindrical member 4. The member 58 is spring biased in two directions. A helical spring 60 surrounds the inner end of the rod 18 and enlarged end of shaft 56, pressing against the inner face of plug 16 and against one face of the annular member 58 to tend to force plug 16 and nose 14 against the stop set screw which affords adjustment between rod 18 and opening in collet 38 to allow entry of stud 50. A helical spring 62 has one end abutting the opposite face of the annular member 58 and the other end abutting a bearing plug 64 in an opening in the casing 2. The member 56 extends through the bearing member 64 and has fixedly mounted on its inner end an electrical contact member 66 coupled to incoming cable 68. Thus the current for producing the weld is supplied from cable 68 through contact member 66, central electrode shaft 56, rod 18 which is in pressure contact with the stud 50 when the weld is being made. The workpiece, of course, acts as a ground or other electrical terminal.

The gun housing also carries with it a control switch 70 adjustably mounted on a bracket 72 inside the handle by screws 73. The switch 70 includes a movable switch arm 74 biased away from a stationary contact 76 to provide a normally open electrical welding circuit. However, when the operator presses forward on the gun housing 2 to force the part, such as stud 50, against the work, the shaft 56 stops when the stud engages the work and is held in place while the spring 62 is collapsed. The cam member 78 on the end of the movable switch arm 74 rides up the cam surface 80 on the electrode member 66 as it moves thereover to close the switch and apply welding current. By adjusting the position of the switch 70 the time of closing of the switch can be adjusted with regard to the force required to properly weld the part.

The casing also has a handle section 82 within which is located a pivotally mounted trigger member 84 which is spring biased by spring 86 forwardly so that the switch 88 controlled thereby is normally open. This particular switch controls air pressure to air lines 24 and 48 to force the collet forward and feed the studs through the flexible channel 44 up to a position in front of the rod 18. If the operator, therefore, squeezes the handle 82 to move the movable arm 84 causing actuation of switch 88, air will be applied to feed the studs into active position.

FIGURE 1 shows the welding gun with the stud 50 in position in front of the rod 18, the welding current off and switch 88 open. Air to chamber 26 is automatically released through suitable timing devices. Piston shank 34, along with attached parts 36, 40, 38 and 42, is driven toward handle 82 by spring 30. Movement of piston shank 34 is stopped by plug 16. Stud 50 is now held by collect 38. The gun is now in condition for application to the workpiece to weld the stud 50 to a desired location. The operator, therefore, graps the handle 82 and brings the insulating shield 42 into position over the point at which the stud is to be affixed. He then presses inwardly on the gun. Forward pressure on the housing 2 tends to compress spring 62, applying pressure to electrode 56. This pushes rod 18 which brings direct pressure on the stud 50 carrying it against the workpiece 90 as shown in FIG. 2. As the casing 2 proceeds forward, cam 78 rides up on the cam surface 80 and switch 70 is actuated to apply welding current through electrode 66, electrode 56, rod 18, stud 50 to ground at the workpiece. The operator then withdraws the welding gun, at the same time squeezing the handle 82 to close switch 88. This applies air through hose 24 to chamber 26, forcing collet holder 34 forward so that the next stud from flexible feed channel 44 can be moved into place. This pressure also is applied to hose 48 to move the stud up into alignment with the rod 18, release air pressure in chamber 26 and return the parts as mentioned above, to their original position. The gun is now ready for the next application and the operator can immediately move to another location on the work, press in on the gun and apply another stud as rapidly as he can move from one location to another location. Concentric spring 60 forces annular member 58 back as the gun is removed from the work to bring the members to their original non-welding position.

It will thus be clear that with this equipment we have provided a resistance welder which does not cause burning or splattering of metal, which can be operated very rapidly to apply parts to large flat surfaces for production.

What is claimed is:

1. In a portable welding apparatus that may be hand carried having a casing supplied with electrical power, fluid pressure and collet means for supporting a part to be welded to a work member, the improvement comprising supply means conveying parts to said collet means in a predetermined position, fluid pressure means connected to said supply means to move said parts sequentially into said collet means, manually actuated means controlling said fluid pressure means to selectively supply parts to said collet means, reciprocable means mounted in said casing and being movable to force a part supported in said collet means into contact with a work member, electrical switching means mounted in said casing and connected to the electrical power source, and mechanical actuating means on said electrical switch means engageable by a part of said reciprocable means to close the switch and apply electric power to said reciprocable means and to the part when the part is pressed through said collet means into engagement with the electrically grounded work member thereby completing an electrical welding circuit.

2. Portable welding means as defined in claim 1 wherein said mechanical actuating means comprises a mechanically actuated switch means mounted in the casing and connected to the source of electrical power thereby controlling the fluid pressure means to supply fluid pressure to the supply means and feed parts to the collet means as desired.

3. Portable welding means as described in claim 1 including adjustable mounting means for mounting the electrical switching means in the casing so that closing of the electrical switching means can be adjusted with respect to the relative position of the reciprocable means and casing to change the force required to properly weld the part.

References Cited by the Examiner

UNITED STATES PATENTS

| 2,537,989 | 1/1951 | Graham | 219—78 |
| 2,662,626 | 12/1953 | Graham et al. | 193—43 |
| 2,892,069 | 6/1959 | Ettema et al. | 219—98 |
| 2,905,803 | 9/1959 | Brady | 219—79 |
| 2,945,118 | 7/1960 | Kelemen et al. | 219—98 |

FOREIGN PATENTS

| 806,526 | 12/1958 | Great Britain. |

RICHARD M. WOOD, *Primary Examiner.*

R. F. STAUBLY, *Assistant Examiner.*